(12) United States Patent
Lin (10) Patent No.: US 12,058,075 B2
(45) Date of Patent: Aug. 6, 2024

(54) METHOD FOR CONTROL CHANNEL MONITORING IN WIDEBAND OPERATION

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 423 days.

(21) Appl. No.: 17/561,611

(22) Filed: Dec. 23, 2021

(65) Prior Publication Data
US 2022/0140989 A1 May 5, 2022

Related U.S. Application Data

(63) Continuation of application No. PCT/IB2019/001174, filed on Oct. 6, 2019.

(30) Foreign Application Priority Data

Sep. 9, 2019 (WO) ............... PCT/FR2019/052075
Sep. 30, 2019 (WO) ............... PCT/IB2019/001094

(51) Int. Cl.
*H04L 5/00* (2006.01)
*H04W 74/0808* (2024.01)

(52) U.S. Cl.
CPC .......... *H04L 5/0053* (2013.01); *H04L 5/0046* (2013.01); *H04L 5/0094* (2013.01); *H04L 5/0098* (2013.01); *H04W 74/0808* (2013.01)

(58) Field of Classification Search
CPC ..... H04L 5/0053; H04L 5/001; H04L 5/0046; H04L 5/0094; H04L 5/0098; H04L 27/0006; H04W 74/0808
See application file for complete search history.

(56) References Cited

U.S. PATENT DOCUMENTS

2019/0274032 A1* 9/2019 Chatterjee ................ H04L 5/00
2019/0349142 A1* 11/2019 Aiba ..................... H04L 1/1819
(Continued)

FOREIGN PATENT DOCUMENTS

EP 3641438 A1 4/2020
WO 2018228529 A1 12/2018
(Continued)

OTHER PUBLICATIONS

International Search Report (ISR) dated Jun. 9, 2020 for Application No. PCT/IB2019/001094.
(Continued)

*Primary Examiner* — Hardikkumar D Patel
(74) *Attorney, Agent, or Firm* — Ladas & Parry, LLP (57) ABSTRACT

A method for control channel monitoring includes: obtaining the wideband configuration indicating information about a plurality of LBT subbands within the wideband; obtaining a CORESET configuration of multiple CORESETs; obtaining a search space set configuration of multiple search space sets, each configured search space set being associated with a configured CORESET and containing an indication to enable/disable multiple subband monitoring; and determining the CORESET to be monitored based on each search space set configuration, so that when the indication is to enable multiple subband monitoring, monitoring the associated CORESET in the LBT subband within which the associated CORESET is confined, and monitoring frequency shifted CORESET of the associated CORESET, in the other LBT subbands of the plurality of LBT subbands, each frequency shifted CORESET being confined within one other LBT subbands; when the indication is to disable multiple subband, monitoring the associated CORESET in the plurality of LBT subbands.

20 Claims, 4 Drawing Sheets

(56) References Cited

U.S. PATENT DOCUMENTS

2020/0120720 A1 4/2020 Wu et al.
2020/0404669 A1* 12/2020 Seo .................... H04L 25/0238

FOREIGN PATENT DOCUMENTS

WO 2018229951 A1 12/2018
WO 2019129014 A1 7/2019
WO 2021048588 A1 3/2021

OTHER PUBLICATIONS

LG Electronics:"Physical layer design of DL signals and channels for NR-U", 3GPP Draft; R1-1900604, 3rd Generation Partnership Project (3GPP), Mobile Competence Centre; 650, Route Des Lucioles; F-06921 Sophia-Antipolis Cedex; France, vol. RAN WG1, No. Taipei, Taiwan; Jan. 21, 2019-Jan. 25, 2019 Jan. 20, 2019(Jan. 20, 2019), XP051593451.
International Search Report (ISR) and Written Opinion dated Jun. 4, 2020 for Application No. PCT/IB2019/001174.
LG Electronics:"Summary on wide-band operation for NR-U", 3GPP Draft; R1-1909458, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019 Sep. 3, 2019(Sep. 13, 2019), XP051766064.

* cited by examiner

CORESET ID=1 ←——————→ SS_ID=1 (enable=false)

FIG. 5A

CORESET ID=1 (SB1)
CORESET ID=1 (SB2)  ←——→ SS_ID=1 (enable=true)
CORESET ID=1 (SB3)

METHOD FOR CONTROL CHANNEL MONITORING IN WIDEBAND OPERATION

CROSS-REFERENCE TO RELATED APPLICATIONS

This application is a continuation of International Application No. PCT/IB2019/001174 filed on Oct. 6, 2019, which claims priorities to International Application No. PCT/FR2019/052075, filed on Sep. 9, 2019 and International Application No. PCT/M2019/001094, filed on Sep. 30, 2019. All of the aforementioned applications are incorporated herein by reference in their entireties.

TECHNICAL FIELD

The present disclosure relates to the field of communication technologies, and in particular, to a method for control channel monitoring in wideband operation performed by a user equipment (UE) and a corresponding method for control channel configuration performed by a base station (BS).

The communication technology is for example a 5G (fifth generation) network using the 5G NR (New Radio) as radio access technology (RAT) defined by 3GPP. The present disclosure is applicable to 5G NR-U (NR in unlicensed spectrum).

BACKGROUND

According to the NR specification Release 15 (NR R15), the UE detects the physical downlink control channel (PDCCH) via checking the PDCCH candidates within its corresponding control-resource set (CORESET).

Coreset

Figure 1:
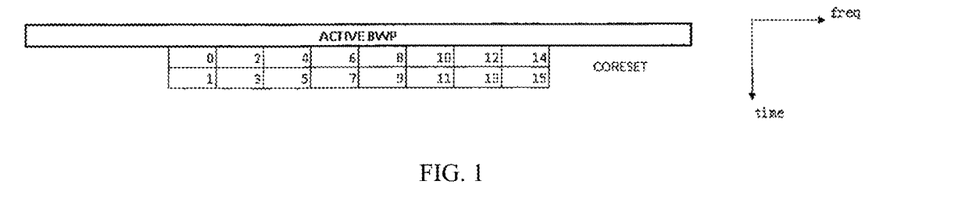
FIG. 1 shows an example of a CORESET configuration.

In NR specification, the CORESET defines the time frequency resources for the BS to transmit the control signal. In frequency domain the CORESET is defined as a multiple of 6 resource blocks (RB) within the bandwidth part (BWP). Thus the CORESET bandwidth can go beyond the BWP. In time domain, the CORESET can be configured to have 1, 2 or 3 OFDM symbols. In the example of FIG. 1, a CORESET is configured within BWP with a frequency bandwidth of 9×6=54 RB and a time duration of 2 OFDM symbols.

Search Space Set

The CORESET defines the time-frequency resources for a BS to transmit the control channel. The search space set defines the monitoring occasion, which is equivalent to the concrete time location where the BS can send the control channel in the CORESET. The search space set is linked to CORESET and additionally provides a periodicity (in slot) and a time location (in symbol). One example is given in FIG. 2, a search space is associated with a CORESET which has two OFDM symbols. The search space set configures the monitoring occasion once every two slots and starts from slot 0. Thus the monitoring slots are slot 0, 2, 4, . . . .

Figure 2:
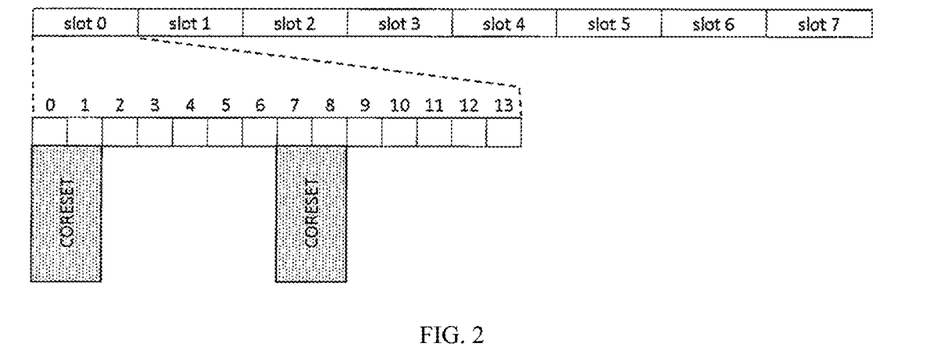
FIG. 2 shows an example of a search space set associated with a CORESET.

Moreover, in the monitoring slots, the search space set further configures that the monitoring starting symbols are at symbol indexes 0 and 7. Thus, the possible resources for the BS to send the control channels are the time-frequency resources configured in CORESET which appear only in the monitoring slot, in which it starts at symbol indexes 0 and 7.

PDCCH Candidate and Aggregation Level

With all the time-frequency resources in a CORESET, the resources can be divided into partitions, each partition will contain a PDCCH candidate. The number of the partitions, aka PDCCH candidates can be configured by the BS in the search space. The aggregation level is highly related to the partition size. There are multiple level can be configured, i.e. AL=1, 2, 4, 8, 16. Larger AL corresponds to larger size of partition, i.e. more resources in one partition but less partitions in one CORESET. Thus, for a given CORESET, large AL value means less PDCCH candidates but each PDCCH candidate has better reliability; while small AL value means more PDCCH candidates, but each PDCCH candidate has lower reliability. PDCCH candidate and AL are configured also in search space. Typically, multiple AL values can be configured within the same search space; and the PDCCH candidate number is associated with each AL.

Unlicensed Band

The unlicensed spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a devices successfully occupies the channel, the transmission duration cannot exceed the Maximum Channel Occupancy Time (MCOT).

Wideband Operation in Unlicensed Band

Figure 3A:
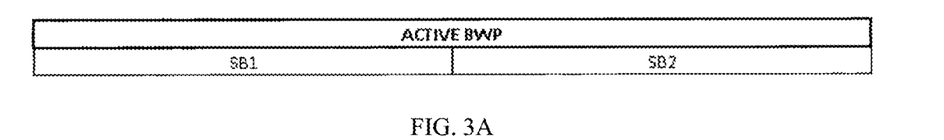
FIG. 3A shows a configuration with an active BWP which contains multiple subbands and FIG. 3B shows a partial transmission within the active BWP.
Figure 3B:
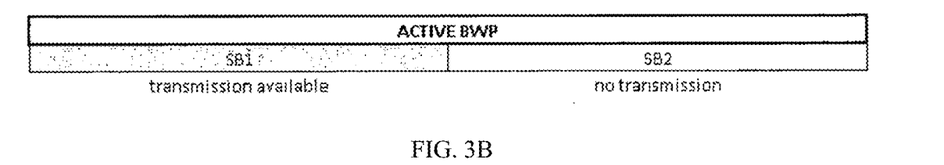

In NR-U wide-band operation, BS and UE can operate in a wider band which consists of multiple subbands (SBs). As defined in NR specification, bandwidth part (BWP) is a subset of contiguous common resource blocks on a given carrier. Thus in the context of NR-U wide-band operation, a UE can be configured with an active BWP which contains multiple subbands, as shown in FIG. 3A. However, by regulation, prior to each transmission in the SB, the sender (i.e. BS) needs to perform a Listen-before-Talk (LBT) procedure. This implies that for multiple SB transmissions, SB-based LBT has to be performed. Since the outcome of the multi-SB LBT cannot be uniform, partial transmission within the active BWP will become a common case as shown in FIG. 3B. Therefore, the question becomes how to design the CORESET to support such partial transmission case.

The SB-based interleaving can avoid the PDCCH puncturing due to SB-LBT failure, but at the same time, it reduces the frequency selectivity.

SUMMARY

A first object of the present disclosure is a method for control channel monitoring, performed by a user equipment in wideband operation in unlicensed band, the method comprising the steps of:
  obtaining the wideband configuration indicating information about a plurality of listen-before-talk (LBT) subbands within the wideband, including LBT subband locations and number of LBT subbands;
  obtaining a control resource set (CORESET) configuration of a plurality of CORESET, each configured CORESET being either confined within one LBT subband or spread across several subbands among the plurality of LBT subbands;

obtaining a search space set configuration of a plurality of search space sets (SS_ID), each configured search space set being associated with a configured CORESET and containing an indication to enable/disable multiple subband monitoring so that:

when the indication is to enable multiple subband monitoring, the associated CORESET is confined within one LBT subband of the plurality of LBT subbands;

when the indication is to disable multiple subband monitoring, there is no restriction on the associated CORESET;

determining the CORESET to be monitored based on each search space set configuration, so that:

when the indication is to enable multiple subband monitoring, monitoring the associated CORESET in the LBT subband within which the associated CORESET is confined, and monitoring frequency shifted CORESET of the associated CORESET, in the other LBT subbands of the plurality of LBT subbands, each frequency shifted CORESET being confined within one other LBT subbands;

when the indication is to disable multiple subband monitoring, monitoring the associated CORESET in the plurality of LBT subbands.

Such method allows the user equipment to realize control channel monitoring in wideband operation without increasing the number of CORESET per bandwidth part thanks to the ability to monitor the control channel adequately depending on the indication to enable multiple subband monitoring. This more flexible control channel monitoring render a good compromise between PDCCH puncture risk and frequency selectivity gain. When the indication is to enable multiple subband monitoring, by confining each CORESET (reference and shifted ones) within one respective subband, it ensures that any unavailable subband will not prevent detecting the control channel within CORESET in another subband as it would be the case with CORESET spread across multiple subbands. By using frequency shifted CORESET, it also does not impair the number of usable CORESET per bandwidth part.

In an embodiment, the indication to enable/disable multiple subband monitoring is an enable bit taking two values "true" for enable or "false" for disable.

In an embodiment, the CORESET configuration includes a CORESET size, a CORESET relative position inside the LBT subband(s) in which it is confined or spread across.

In an embodiment, the configuration of a plurality of search space sets further contains an indication of the search space set type among which common search space (CS S) or UE specific search space (US S).

In an embodiment, each configured search space set is being ranked with a search space set index, the method further comprises the step of: applying search space set priority rules using one or a combination of several of the following priority rules in any order:

a configured search space set of a CSS-type, or USS-type, has higher priority than a configured search space set of a USS type, or CSS-type respectively; and/or a configured search space set when the indication is to enable, or disable, multiple subband monitoring has higher priority than a configured search space set when the indication is to disable, or enable respectively, multiple subband monitoring; and/or for configured search space sets of a same CSS/USS type and with a same indication to enable/disable multiple subband monitoring, a configured search space set with a lower, or higher, index value has higher priority than a configured search space set with a higher, or lower respectively, index value.

In an embodiment, a first, or a second, applied priority rule is such that a configured search space set of a CSS-type has higher priority than a configured search space set of a USS type and a second, or a first respectively, applied priority rule is such that a configured search space set when the indication is to enable multiple subband monitoring has higher priority than a configured search space set when the indication is to disable multiple subband monitoring. In an embodiment, the third applied priority rule is such that, for configured search space sets of a same CSS/USS type and with a same indication to enable/disable multiple subband monitoring, a configured search space set with a lower index value has higher priority.

In an embodiment, the method further comprises the step of determining a search space set priority such that a configured search space set when the indication is to enable multiple subband monitoring has higher priority than a configured search space set when the indication is to disable multiple subband monitoring.

In an embodiment, each configured search space set is being ranked with a search space set index and the method further comprises the step of determining a search space set priority such that, for configured search space sets of a same CSS/USS type and with a same indication to enable/disable multiple subband monitoring, a configured search space set with a lower index value has higher priority.

In an embodiment, the method further comprises the step of skipping a determined number of configured search space sets based on their search space set priority if the total number of control channel blind decoding exceeds a pre-defined maximum number.

In an embodiment, the method further comprises the steps of skipping the configured search space sets from the lowest priority to the highest priority; checking if the total number of control channel blind decoding still exceeds a pre-defined maximum number after skipping one configured search space set; and repeating the skipping step until the checking step is negative.

In an embodiment, the method further comprises the step of obtaining an indication on LBT subband availability. In an embodiment, the LBT subband availability indication is either directly signaled by the network or indirectly derived by the UE based on other downlink channels or signals.

In an embodiment, the method further comprises the step of skipping monitoring CORESET in non-available LBT subbands. It ensures that control channel monitoring is only performed in available subbands.

In an embodiment, a configured search space set contains an indication to enable multiple subband monitoring and the LBT subbands of the CORESET to be monitored are available, the method further comprises the step of monitoring only one CORESET in one of the available subbands. In an embodiment, the CORESET to monitor is configured by a downlink control information (DCI) or the LBT subband to monitor is configured with a pre-defined rule.

In an embodiment, the control channel to monitor is a physical downlink control channel (PDCCH).

A second object of the present disclosure is a user equipment (UE), operable for control channel monitoring in a mobile telecommunication network, comprising one or more processors configured to control the execution of the method defined in the first object.

A third object of the present disclosure is a method for configuring a control channel, performed by a next generation base station (gNB), in wideband operation in unlicensed band, the method comprising the steps of:

configuring the wideband by indicating information about a plurality of listen-before-talk (LBT) subbands within the wideband, including LBT subband locations and number of LBT subbands;

configuring a plurality of control resource sets (CORESET), each configured CORESET being either confined within one LBT subband or spread across several subbands among the plurality of LBT subbands;

configuring a plurality of search space sets (SSJD), each configured search space set being associated with a configured CORESET and containing an indication to enable/disable multiple subband monitoring so that:

when the indication is to enable multiple subband monitoring, the associated CORESET is confined within one LBT subband of the plurality of LBT subbands;

when the indication is to disable multiple subband monitoring, there is no restriction on the associated CORESET.

Such method allows the base station to realize control channel configuration in wideband operation without increasing the number of CORESET per bandwidth part thanks the indication to enable multiple subband monitoring. This more flexible control channel configuration render a good compromise between PDCCH puncture risk and frequency selectivity gain.

In an embodiment, the base station can configure up to M CORESETS, M being a pre-defined value. In an embodiment, the base station can configure up to N search space sets, N being a pre-defined value.

In an embodiment, the indication to enable/disable multiple subband monitoring is an enable bit taking two values "true" for enable or "false" for disable.

In an embodiment, the CORESET configuration includes a CORESET size, a CORESET relative position inside the LBT subband(s) in which it is confined or spread across. In an embodiment, the relative position is given by any relative resource block (RB) position between the CORESET and the starting RB of the LBT suband.

In an embodiment, the configuration of a plurality of search space sets further contains an indication of the search space set type among which common search space (CSS) or UE specific search space (USS).

In an embodiment, the method further comprises the step of sending an indication on LBT subband availability. In an embodiment, the LBT subband availability indication is either directly signaled by the network or indirectly derived by the UE based on other downlink channels or signals.

In an embodiment, a CORESET to monitor is configured by a downlink control information (DCI) or a LBT subband to monitor is configured with a pre-defined rule.

In an embodiment, the control channel to configure is a physical downlink control channel (PDCCH).

A fourth object of the present disclosure is related to a next generation base station (gNB) operable to configure a control channel (PDCCH) in a mobile telecommunication network, comprising one or more processors configured to control the execution of the method defined in the third object.

A fifth object of the present disclosure is related to a computer readable medium comprising program instructions for causing a user equipment to perform the steps of the method according to the first object.

A sixth object of the present disclosure is related to a computer readable medium comprising program instructions for causing a next generation base station to perform the steps of the method according to the third object.

BRIEF DESCRIPTION OF DRAWINGS

The appended drawings required in description of embodiments or the prior art will be briefly described below.

DESCRIPTION OF EMBODIMENTS

In the following disclosure, we present an example of a method that allows the user equipment (UE) realizing control channel monitoring and the base station (BS) realizing control channel configuration in wideband operation without increasing the number of CORESET per bandwidth part (BWP).

Figure 4:
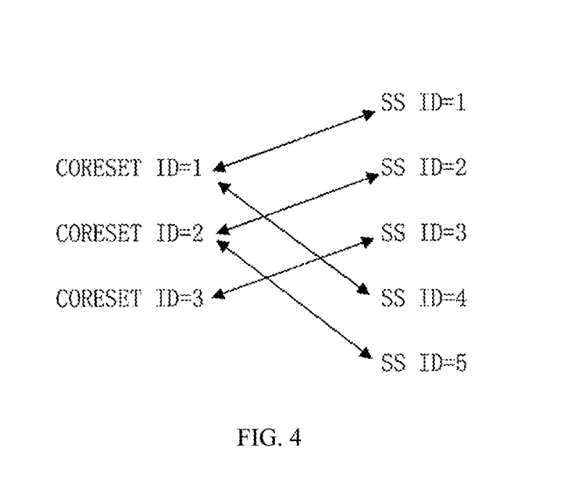
FIG. 4 shows the association between several CORESETs and search space sets.

In NR R15, the search space is associated with the CORESET via the association between the search space index (ID) and CORESET index (ID). FIG. 4 shows one example of the association between CORESET and search space sets. In this example different CORESETJD are associated with different search space set ID as shown in the Table 1 below:

TABLE 1

| CORESET ID = 1 | associated with | SS ID = 1 and SS ID = 4 |
| CORESET ID = 2 | | SS ID = 2 and SS ID = 5 |
| CORESET ID = 3 | | SS ID = 3 |

Figure 5A:
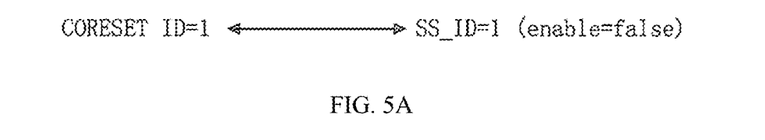
FIGS. 5A and 5B show the association between one CORESET and search space sets depending on the enable bit.
Figure 5B:
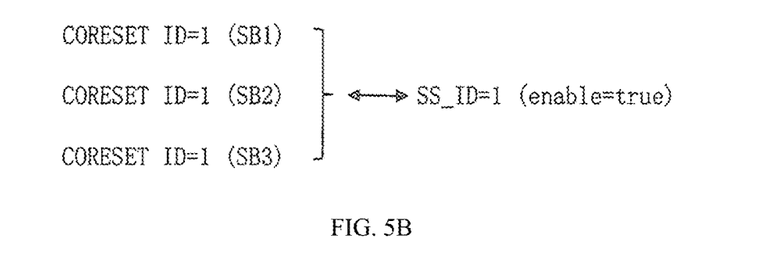

In the present disclosure, we introduce an indication to enable/disable multiple subband monitoring, for example in the form of a special enable (or disable) bit to the search space set configuration. When this enable bit is disabled (enable=false), the search space configuration is the same as defined in NR Rel.15 as shown in FIG. 5A. When the enable bit is enabled (enable=true), the search space will monitor the CORESET in all configured LBT subbands as shown in FIG. 5B. The CORESET is the same as the one associated with the search space set but when UE monitors different subbands, the CORESET frequency location should be moving from one LBT subband to the other forming so-called frequency shifted CORESET.

Example 1: Enable Bit

Figure 6:
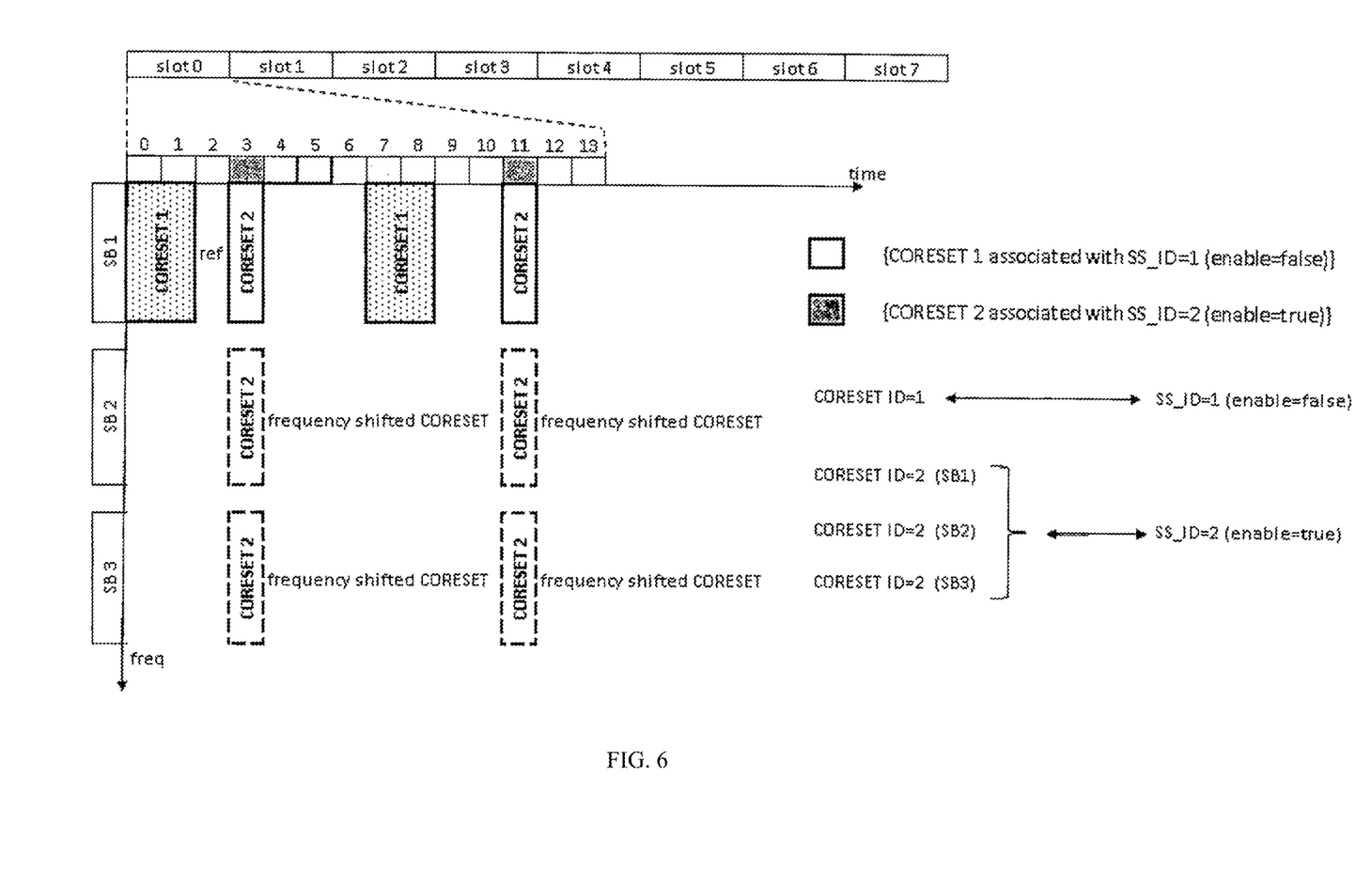
FIG. 6 shows a configuration with frequency shifted CORESET in multiple subbands.

In a wideband system with 3 LBT subbands, the base station (BS) configures two CORESETs, i.e. CORESET ID1 and ID2 as shown in FIG. 6. Assuming that the CORESET configuration configures these two CORESETs both in SB1. Then two search space sets, SS ID1 and SS ID2, are associated with CORESET 1 and CORESET 2, respectively.

In this example, for SS ID1 configuration, the enable bit is false, which means that the UE will only monitor CORESET 1 in SB1. On the contrary, the enable bit of SS ID2 is set to true, which means that the UE will monitor CORESET 2 in all the configured LBT subbands, i.e. SB1, SB2 and SB3. The CORESET 2 in SB2 and SB3 is a frequency shifted CORESET of CORESET 2 in SB1.

Example 2: LBT Availability

In another example with a similar configuration as the one of example 1, before the UE receives an explicit LBT subband availability indication from the BS, e.g. via CG-PDCCH, the UE monitors all subbands with SS ID2.

Figure 7:
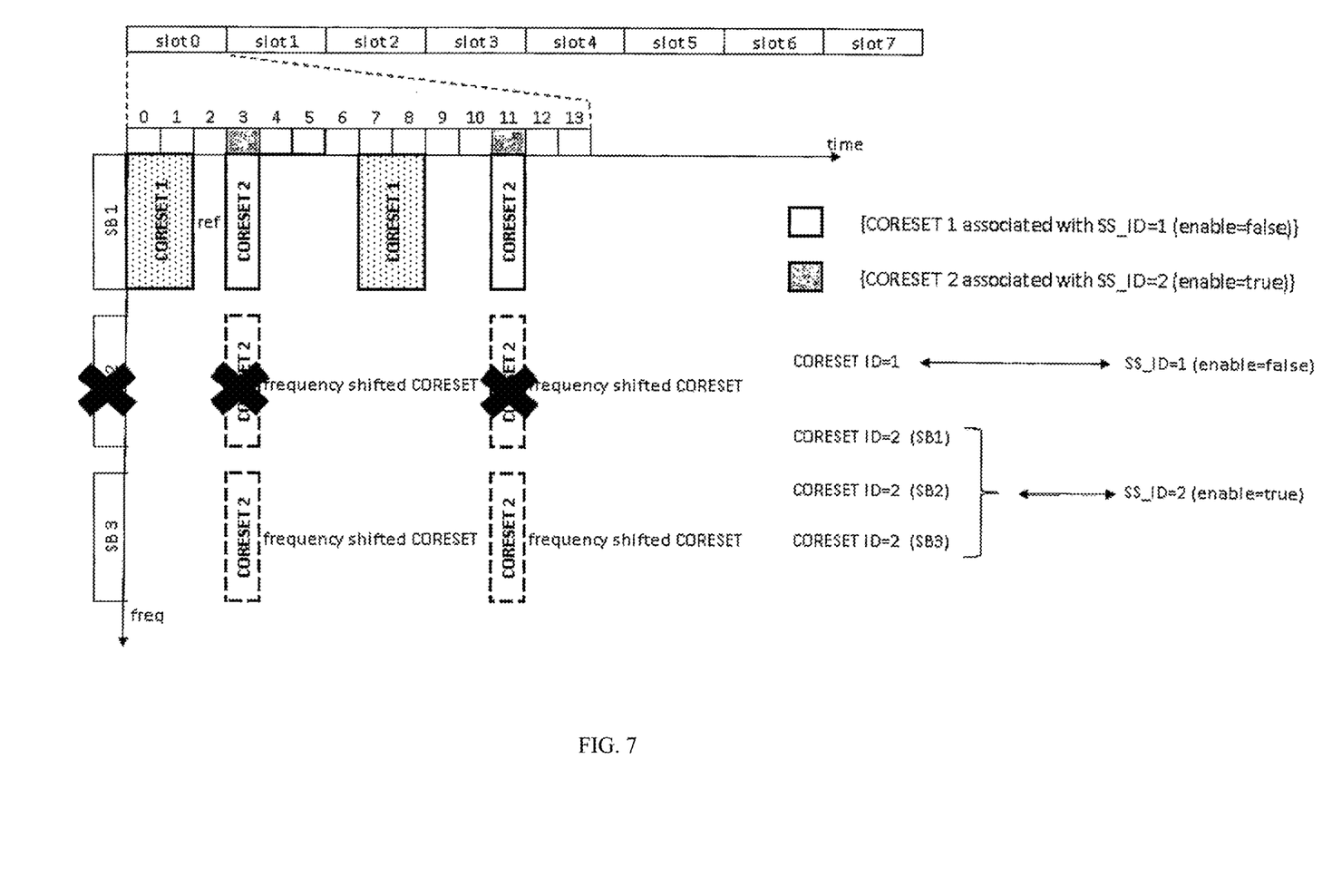
FIG. 7 shows a configuration similar to FIG. 6 after performing a LBT procedure.

When the UE receives the LBT subband availability indication from the BS, it ignores the CORESET monitoring in the non-available subband SB2 as shown in FIG. 7.

Another option is that when the LBT subband availability is known to the UE, the UE will only monitor one CORESET in one SB. One example is that the UE will only monitor the CORESET in the lowest SB index among all the available SBs.

Example 3: Size Reduction and Priority Rules

Assuming in a given slot, multiple search space sets collide together, thus the number of PDCCH blind decoding may exceed a pre-defined maximum value. In this case, we propose that some SS_ID should be switched off following certain priority rules, in an embodiment set in the standard specification, as for example:
- search space set configured with common search space (CSS) has higher priority than search space set configured with UE specific search space (USS);
- search space set configured with enable bit with true value has higher priority than search space set configured with enable bit with false value;
- for search space set configured with same CSS/USS type and same enable bit priority level, search space set with lower index value has higher priority.

For example, network configures the search space sets as shown in the Table 2 below:

TABLE 2

| SS ID  | CSS/USS type | Enable bit | Priority order |
|--------|--------------|------------|----------------|
| SS ID1 | CSS          | True       | 1              |
| SS ID2 | CSS          | False      | 2              |
| SS ID3 | USS          | true       | 3              |
| SS ID4 | USS          | False      | 4              |
| SS ID5 | USS          | false      | 5              |

When the total number of blind decoding in a slot exceeds a pre-defined maximum value, the UE will skip monitoring the search space set from the lowest priority to highest priority.

List of abbreviations in the description and drawings:

| Acronyms | Full name |
|----------|-----------|
| LTE      | Long Term Evolution |
| LTE-A    | Advanced long term evolution |

-continued

| Acronyms | Full name |
|----------|-----------|
| NR       | New Radio |
| NR-U     | New Radio-unlicensed |
| gNB      | Next generation base station Node B |
| UE       | User Equipment |
| PDCCH    | Physical Downlink Control CHannel |
| PDSCH    | Physical Downlink Shared CHannel |
| SS       | Search Space |
| CORESET  | Control Resource Set |
| DMRS     | DeModulation Reference Signal |
| DCI      | Downlink control information |
| SB       | Subband |
| LBT      | Listen Before Talk |
| CCE      | Control Channel Element |
| COT      | Channel Occupancy Time |
| MCOT     | Maximum Channel Occupancy Time |
| RRC      | Radio Resource Control |
| CG-PDCCH | Group-Common Physical Downlink Control Channel |

In the above description, the mobile telecommunication system is a 5G mobile network comprising a 5G NR access network. The present example embodiment is applicable to NR in unlicensed spectrum (NR-U). The present disclosure can be applied to other mobile networks, in particular to mobile network of any further generation cellular network technology (6G, etc.).

The above is only a specific implementation manner of the present disclosure, the protection scope of the present disclosure is not limited thereto, and changes or substitutions that can easily be thought of by those skilled in the art within the technical scope disclosed in the present disclosure should be covered by the protection scope of the present disclosure. Therefore, the protection scope of the present disclosure should be subject to the protection scope of the claims.

The various embodiments/examples, aspects and features, if any, described in this specification that do not fall under the scope of the independent claims are to be interpreted as examples useful for understanding various embodiments of the disclosure.

What is claimed is:

1. A method for control channel monitoring, performed by a user equipment (UE) in wideband operation in unlicensed band, the method comprising the steps of:
   obtaining a wideband configuration indicating information about a plurality of listen-before-talk (LBT) subbands within a wideband, including LBT subband locations and number of LBT subbands;
   obtaining a control resource set (CORESET) configuration of a plurality of CORESET, each configured CORESET being either confined within one LBT subband or spread across several subbands among the plurality of LBT subbands;
   obtaining a search space set configuration of a plurality of search space sets (SS_ID), each configured search space set being associated with a configured CORESET and containing an indication to enable/disable multiple subband monitoring so that:
      when the indication is to enable multiple subband monitoring, the associated CORESET is confined within one LBT subband of the plurality of LBT subbands;
      when the indication is to disable multiple subband monitoring, there is no restriction on the associated CORESET;
   determining a CORESET to be monitored based on each search space set configuration, so that:

when the indication is to enable multiple subband monitoring,
monitoring the associated CORESET in a LBT subband within which the associated CORESET is confined, and
monitoring frequency shifted CORESET of the associated CORESET, in the other LBT subbands of the plurality of LBT subbands, each frequency shifted CORESET being confined within one other LBT subbands;
when the indication is to disable multiple subband monitoring, monitoring the associated CORESET in the plurality of LBT subbands.

2. The method for control channel monitoring according to claim 1, wherein the indication to enable/disable multiple subband monitoring is an enable bit taking two values "true" for enable or "false" for disable.

3. The method for control channel monitoring according to claim 1, wherein the CORESET configuration includes a CORESET size, a CORESET relative position inside the LBT subband(s) in which it is confined or spread across.

4. The method for control channel monitoring according to claim 1, wherein the configuration of a plurality of search space sets further contains an indication of a search space set type among which common search space (CSS) or UE specific search space (USS).

5. The method for control channel monitoring according to claim 4, wherein each configured search space set is being ranked with a search space set index, the method further comprising the step of:
applying search space set priority rules using one or a combination of several of the following priority rules in any order:
a configured search space set of a CSS-type, or USS-type, has higher priority than a configured search space set of a USS type, or CSS-type respectively; and/or
a configured search space set when the indication is to enable, or disable, multiple subband monitoring has higher priority than a configured search space set when the indication is to disable, or enable respectively, multiple subband monitoring; and/or
for configured search space sets of a same CSS/USS type and with a same indication to enable/disable multiple subband monitoring, a configured search space set with a lower, or higher, index value has higher priority than a configured search space set with a higher, or lower respectively, index value.

6. The method for control channel monitoring according to claim 5, wherein a first, or a second, applied priority rule is such that a configured search space set of a CSS-type has higher priority than a configured search space set of a USS type and a second, or a first respectively, applied priority rule is such that a configured search space set when the indication is to enable multiple subband monitoring has higher priority than a configured search space set when the indication is to disable multiple subband monitoring.

7. The method for control channel monitoring according to claim 6, wherein a third applied priority rule is such that, for configured search space sets of a same CSS/USS type and with a same indication to enable/disable multiple subband monitoring, a configured search space set with a lower index value has higher priority.

8. The method for control channel monitoring according to claim 5, the method further comprising the step of:
skipping a determined number of configured search space sets based on their search space set priority if the total number of control channel blind decoding exceeds a pre-defined maximum number.

9. The method for control channel monitoring according to claim 8, the method further comprising the step of:
skipping the configured search space sets from a lowest priority to a highest priority;
checking if the total number of control channel blind decoding still exceeds a pre-defined maximum number after skipping one configured search space set;
repeating the skipping step until the checking step is negative.

10. The method for control channel monitoring according to claim 1, the method further comprising the step of:
obtaining an indication on LBT subband availability.

11. The method for control channel monitoring according to claim 10, wherein the LBT subband availability indication is either directly signaled by a network or indirectly derived by the UE based on other downlink channels or signals.

12. The method for control channel monitoring according to claim 10, the method further comprising the step of:
skipping monitoring CORESET in non-available LBT subbands.

13. The method for control channel monitoring according to claim 10, wherein a configured search space set contains an indication to enable multiple subband monitoring and the LBT subbands of the CORESET to be monitored are available, the method further comprising the step of:
monitoring only one CORESET in one of the available subbands.

14. The method for control channel monitoring according to claim 13, wherein the CORESET to monitor is configured by a downlink control information (DCI) or a LBT subband to monitor is configured with a pre-defined rule.

15. The method for control channel monitoring according to claim 1, wherein a control channel to monitor is a physical downlink control channel (PDCCH).

16. A user equipment (UE), operable for control channel monitoring in a mobile telecommunication network, comprising one or more processors configured to control the execution of the method defined in claim 1.

17. A method for configuring a control channel, performed by a next generation base station (gNB), in wideband operation in unlicensed band, the method comprising the steps of:
configuring a wideband by indicating information about a plurality of listen-before-talk (LBT) subbands within the wideband, including LBT subband locations and number of LBT subbands;
configuring a plurality of control resource sets (CORESET), each configured CORESET being either confined within one LBT subband or spread across several subbands among the plurality of LBT subbands;
configuring a plurality of search space sets (SS_ID), each configured search space set being associated with a configured CORESET and containing an indication to enable/disable multiple subband monitoring so that:
when the indication is to enable multiple subband monitoring, the associated CORESET is confined within one LBT subband of the plurality of LBT subbands;
when the indication is to disable multiple subband monitoring, there is no restriction on the associated CORESET.

18. The method for configuring a control channel according to claim 17, wherein the indication to enable/disable multiple subband monitoring is an enable bit taking two values "true" for enable or "false" for disable.

19. The method for configuring a control channel according to claim 17, wherein the CORESET configuration includes a CORESET size, a CORESET relative position inside the LBT subband(s) in which it is confined or spread across.

20. A next generation base station (gNB) operable to configure a control channel (PDCCH) in a mobile telecommunication network, comprising one or more processors configured to control the execution of the method defined in claim 17.

* * * * *